(12) United States Patent
Kalyankar et al.

(10) Patent No.: US 8,852,679 B2
(45) Date of Patent: *Oct. 7, 2014

(54) HIGH-THROUGHPUT COMBINATORIAL DIP-COATING METHODOLOGIES FOR SELECTING PARTICLE-CONTAINING FORMULATIONS AND DEPOSITING CONTAMINANTS ON SUBSTRATES

(75) Inventors: Nikhil D. Kalyankar, Hayward, CA (US); Nitin Kumar, Fremont, CA (US); Zhi-Wen Sun, San Jose, CA (US); Kenneth A. Williams, Livermore, CA (US)

(73) Assignee: Intermolecular, Inc., San Jose, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/160,732

(22) Filed: Jun. 15, 2011

(65) Prior Publication Data

US 2012/0156498 A1 Jun. 21, 2012

Related U.S. Application Data

(63) Continuation of application No. 12/970,638, filed on Dec. 16, 2010.

(51) Int. Cl.
| | | |
|---|---|---|
| *B05D 1/24* | (2006.01) | |
| *B03B 7/00* | (2006.01) | |
| *B03B 13/00* | (2006.01) | |
| *B01J 19/00* | (2006.01) | |
| *C40B 30/00* | (2006.01) | |
| *C23C 18/12* | (2006.01) | |
| *C40B 60/12* | (2006.01) | |

(52) U.S. Cl.
CPC .... *C23C 18/1254* (2013.01); *B01J 2219/00691* (2013.01); *B01J 19/0046* (2013.01); *C40B 30/00* (2013.01); *B01J 2219/00756* (2013.01); *C40B 60/12* (2013.01); *B01J 2219/0036* (2013.01); *B01J 2219/00702* (2013.01); *B01J 2219/00443* (2013.01)
USPC ............... 427/184; 209/4; 209/47; 209/49; 209/51; 427/196; 427/201; 427/256; 427/331; 427/430.1; 427/434.5

(58) Field of Classification Search
USPC ............ 209/4, 7, 9, 11, 13, 47, 49, 487, 508; 428/403; 427/184, 196, 201, 256, 331, 427/430.1, 434.5
See application file for complete search history.

(56) References Cited

U.S. PATENT DOCUMENTS 2,468,472 A * 4/1949 Townsend ........................ 209/11
4,077,871 A * 3/1978 Kumar et al. ..................... 209/4

(Continued)

OTHER PUBLICATIONS

Fan and Stebe, Size-selective deposition and sorting of lyophlic colloidal particles on surfaces of patterned wettability, Langmuir 2005, 21, 1149-1152 (2004).*

(Continued)

*Primary Examiner* — Holly Le

(57) ABSTRACT

Embodiments of the current invention describe a high performance combinatorial method and apparatus for the combinatorial development of coatings by a dip-coating process. The dip-coating process may be used for multiple applications, including forming coatings from varied sol-gel formulations, coating substrates uniformly with particles to combinatorially test particle removal formulations, and the dipping of substrates into texturing formulations to combinatorially develop the texturing formulations.

15 Claims, 8 Drawing Sheets

(56) References Cited

U.S. PATENT DOCUMENTS

| | | | |
|---|---|---|---|
| 5,311,997 A * | 5/1994 | Gantt et al. | 209/4 |
| 6,562,411 B2 * | 5/2003 | Vanmaele et al. | 427/402 |
| 6,592,821 B1 * | 7/2003 | Wada et al. | 422/68.1 |
| 6,938,777 B2 * | 9/2005 | Call et al. | 209/143 |
| 2011/0151105 A1 * | 6/2011 | Kalyankar et al. | 427/8 |

OTHER PUBLICATIONS

Fan et al., Size-selective deposition and sorting of lyophilic colloidal particles on surfaces of patterned wettability, Langmuir 2005, 21, 1149-1152.*

* cited by examiner

HIGH-THROUGHPUT COMBINATORIAL DIP-COATING METHODOLOGIES FOR SELECTING PARTICLE-CONTAINING FORMULATIONS AND DEPOSITING CONTAMINANTS ON SUBSTRATES

FIELD OF THE INVENTION

The present invention relates generally to semiconductor and solar processing. More specifically, an apparatus for high throughput combinatorial dip-coating of varied thin films and the methods of combinatorial testing are described.

BACKGROUND OF THE INVENTION

Combinatorial processing enables rapid evaluation of semiconductor, solar, or energy processing operations. The systems supporting the combinatorial processing are flexible to accommodate the demands for running the different processes either in parallel, serial or some combination of the two.

Some exemplary processing operations include operations for adding (depositions) and removing layers (etch), defining features, preparing layers (e.g., cleans), doping, etc. Similar processing techniques apply to the manufacture of integrated circuit (IC) semiconductor devices, flat panel displays, optoelectronics devices, data storage devices, magneto electronic devices, magneto optic devices, packaged devices, and the like. As feature sizes continue to shrink, improvements, whether in materials, unit processes, or process sequences, are continually being sought for the deposition processes. However, semiconductor and solar companies conduct research and development (R&D) on full wafer processing through the use of split lots, as the conventional deposition systems are designed to support this processing scheme. This approach has resulted in ever escalating R&D costs and the inability to conduct extensive experimentation in a timely and cost effective manner. Combinatorial processing as applied to semiconductor, solar, or energy manufacturing operations enables multiple experiments to be performed at one time in a high throughput manner. Equipment for performing the combinatorial processing and characterization must support the efficiency offered through the combinatorial processing operations.

BRIEF DESCRIPTION OF THE DRAWINGS

Various embodiments of the invention are disclosed in the following detailed description and the accompanying drawings:

FIG. 1 is a diagram of a combinatorial funnel for screening materials;

FIG. 2 is a plan schematic view of a high performance combinatorial (HPC) dip-coating tool according to one embodiment of the present invention;

FIG. 3 is an isometric view of a well holder within the dip-coating tool of FIG. 2;

FIG. 4 is an isometric view of a dispense head within the dip-coating tool of FIG. 2;

FIG. 5 is an isometric view of a substrate holder within the dip-coating tool of FIG. 2;

FIG. 6 is a flowchart of a method for the screening of coatings formed by a sol-gel process;

FIG. 7 is a flowchart of a method for screening of particle cleaning formulations; and FIG. 8 is cross-sectional side view of a combinatorial wet processing tool according to another embodiment of the present invention.

DETAILED DESCRIPTION

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Embodiments of the current invention describe a high performance combinatorial apparatus for the combinatorial development of coatings by a dip-coating process. The dip-coating process may be used for multiple applications, including forming coatings from varied sol-gel formulations, coating substrates uniformly with particles to combinatorially test particle removal formulations, and the dipping of substrates into texturing formulations to combinatorially develop the texturing formulations.

Sol-Gel Coating Application

Sol-gel processes are those where a wet formulation (the "sol") is dried to form a gel coating having both liquid and solid characteristics. The gel coating is then treated to form a solid material. The gel coating or the solid material may be formed by applying a thermal treatment to the sol. This technique is valuable for the development of coatings because it is easy to implement and provides films of uniform composition and thickness. Therefore, sol-gel processes are valuable for development as combinatorial processes to develop coatings for various applications such as for materials used in semiconductor device manufacturing, solar cell manufacturing, glass manufacturing, or energy cell manufacturing.

The coatings formed by sol-gel processes may be developed using combinatorial methods of optimizing the sol-gel formulations and conditions used to create those coatings. Combinatorial processing may include any processing that varies the processing conditions in two or more substrates or regions of a substrate. The combinatorial methodology, in embodiments of the current invention, includes multiple levels of screening to select the coatings for further variation and optimization.

FIG. 1 illustrates a diagram 100 showing three levels of screening for the development of a coating using combinatorial methodologies. The diagram 100 is in the shape of a "funnel" and includes three levels of screening, a primary screening 102, a secondary screening 104, and a tertiary screening 106, as well as a device qualification stage 108 and a manufacturing stage 110.

As indicated by the funnel, the primary screening 102 includes the largest number of samples of coatings formed by a sol-gel process. During the secondary screening 104, a smaller number of samples are tested, while the tertiary screening 106 involves testing the least number of coatings. Thus, the funnel-like shape of the diagram indicates that fewer and fewer samples are used at each step. The number of samples used at any of the screening levels may be dependent on the substrate or tools used to process the samples.

The screening at the different levels of the funnel is designed to identify and to optimize a coating having predetermined qualities. Combinatorial processing includes performing a large number of processes and materials during a first screen, selecting promising candidates from those processes, performing the selected processing during a second screen, selecting promising candidates from the second screen, and so on. In addition, feedback from later stages to earlier stages can be used to refine the success criteria and provide better screening results.

For example, thousands of materials are evaluated during the primary screening, or materials discovery stage, 102. Promising candidates selected based on the results of the materials discovery stage 102 are advanced to the secondary screening, or materials and process development stage, 104. Evaluation of the materials may then be performed using metrology tools such as physical and electronic testers and imaging tools. The materials and process development stage 104 may evaluate hundreds of materials (i.e. a magnitude smaller than the number of materials during the materials discovery state 102) and may focus on the processes used to deposit or develop those materials. Based on the results of the materials and process development stage 104, promising materials and processes are again selected and advanced to the tertiary screening, or process integration stage, 106, where tens of materials and/or processes and combinations are evaluated. The process integration stage 106 may focus on integrating the selected processes and materials with other processes and materials into structures.

Figure 1:
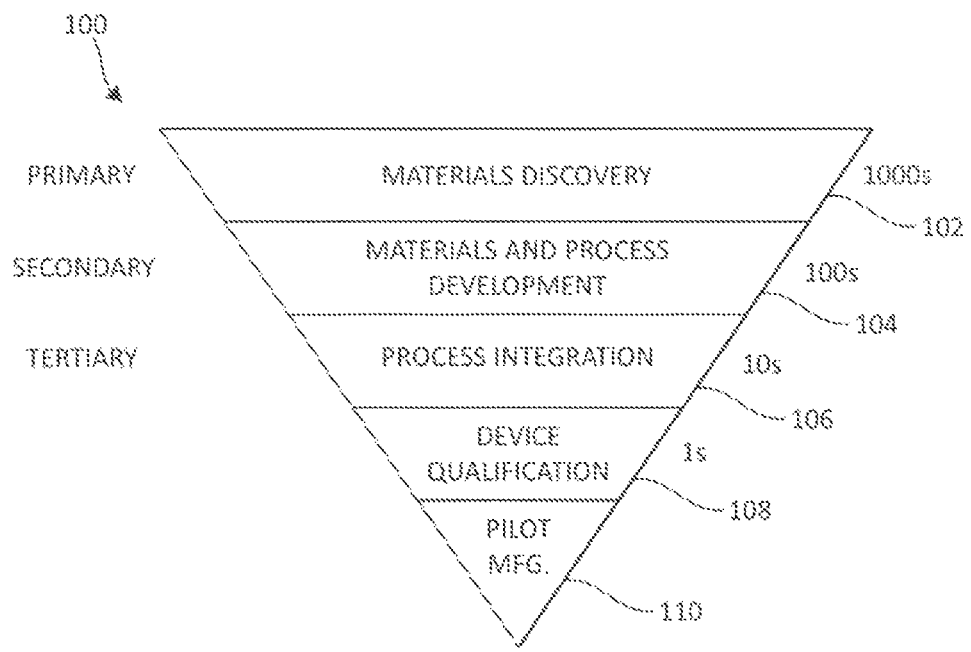

The most promising materials and processes from the process integration stage 106 are advanced to the device qualification stage 108. During the device qualification stage 108, the materials and processes selected are evaluated for high volume manufacturing, which may be conducted on full wafers within production tools. The results are evaluated to determine the efficacy of the selected materials, processes, and integration. If successful, the use of the screened materials and processes can proceed to the manufacturing stage 110. The schematic diagram 100 shown in FIG. 1 is an example of various techniques that may be used to evaluate and select materials, processes, and integration for the development of semiconductor, solar, or energy devices. The descriptions of primary, secondary, etc. screening and various stages 102-110 are arbitrary and the stages may overlap, occur out of sequence, be described and be performed in many other ways.

In one embodiment of the present invention, during the primary screening 102, coating materials formed by a dip-coating sol-gel process are combinatorially screened in a high throughput manner to identify coatings that have predetermined qualities. Dip-coating is one method of sol-gel processing. Other methods of sol-gel processing include spin coating, curtain coating, or spray coating. It has been determined that dip-coating can be correlated to the other methods of sol-gel processing and thus serve as a primary screen for coatings formed by sol-gel processing. Dip-coating may be chosen as the primary screening process because it can be adapted to process large numbers of coatings for high throughput combinatorial screening.

Figure 2:
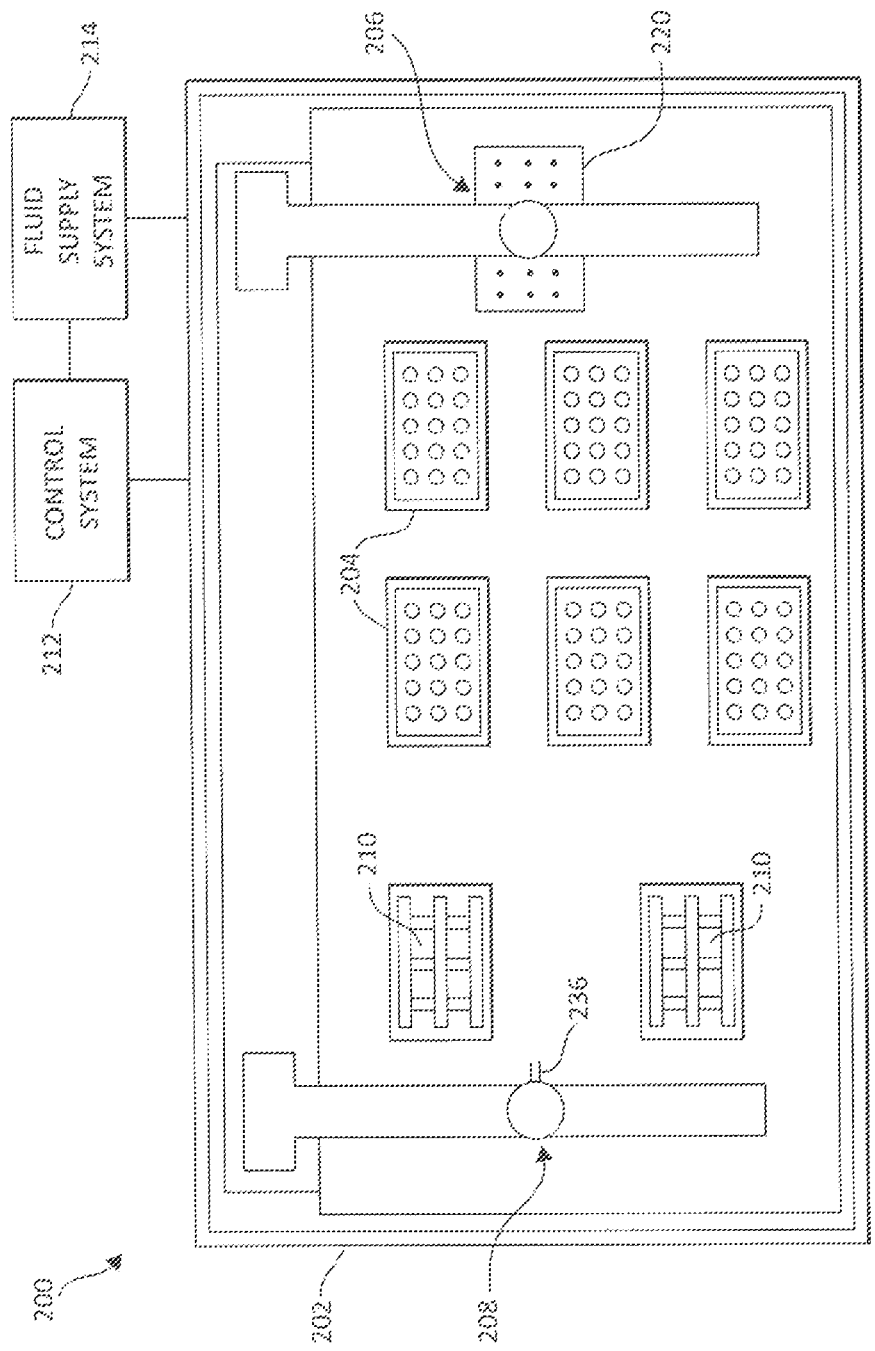

FIG. 2 illustrates a high performance combinatorial (HPC) dip-coating apparatus (or tool or system) 200 that may be used to process and screen many coatings in parallel during a primary screening. The dip-coating apparatus 200 includes a housing (and/or processing chamber) 202, well holders 204 coupled to (and within) the housing 202, a dispense arm (or dispense arm assembly) 206, and a dip-coating arm (or dip coating arm assembly) 208, substrate holders 210, a control system 212, and a fluid supply system 214. The housing 202 may control the environment in which the processing occurs. In an embodiment where the dip-coated substrates are dried by exposure to air, the control of the environment within the housing 202 may be useful.

The fluid supply system 214 may include one or more supplies of the various processing fluids (i.e., liquids, gases, etc.) used in the methods and processes described herein. The control system 212 may include a processor and memory (i.e., a computing system) in operable communication with the other components of the dip-coating tool 200 and be configured to control the operation thereof in accordance with the methods and processes described herein.

It should also be understood that although not shown as a separate component, the dip-coating tool 200 includes a variation generating system (or subsystem) capable of creating variations between at least two of the formulations, substrates, coatings, or portions of a single substrate, as described in greater detail below. These variations may relate to specifications such as temperatures, exposure times, layer thicknesses, chemical compositions, humidity, etc. of the formulations and/or the substrates at various stages of the screening processes described herein. It should be understood that these variations are intentionally created for the purposes of evaluating the characteristics of specific materials and processing techniques in order to identify those that are best suited for particular uses.

Figure 3:
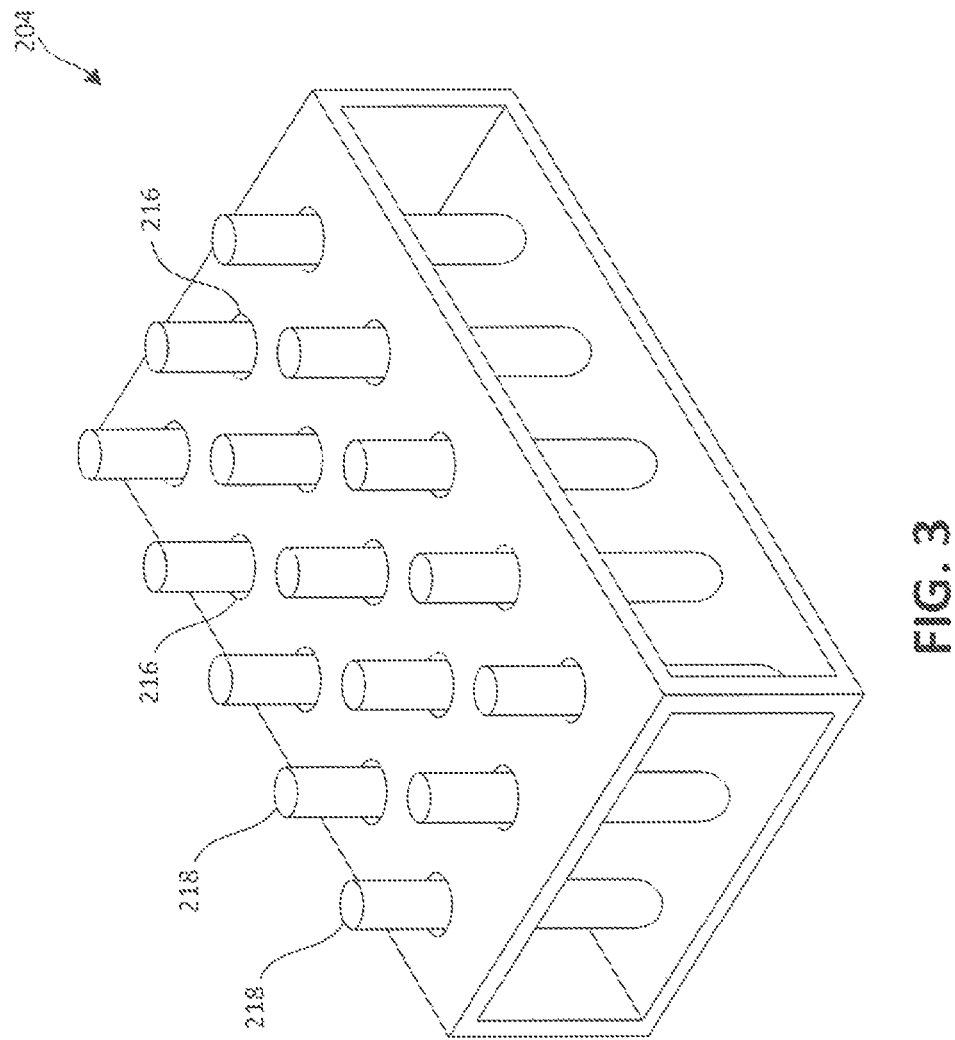

FIG. 3 illustrates one of the well holders 204 in greater detail. The well holder 204 includes an array of openings 216 in an upper portion thereof. Each of the openings 216 holds a well (or vial) 218. In the depicted embodiment, the openings 216 and/or the wells 218 are arranged in a 3×5 array, for a total of fifteen openings 216 and/or wells 218.

Figure 4:
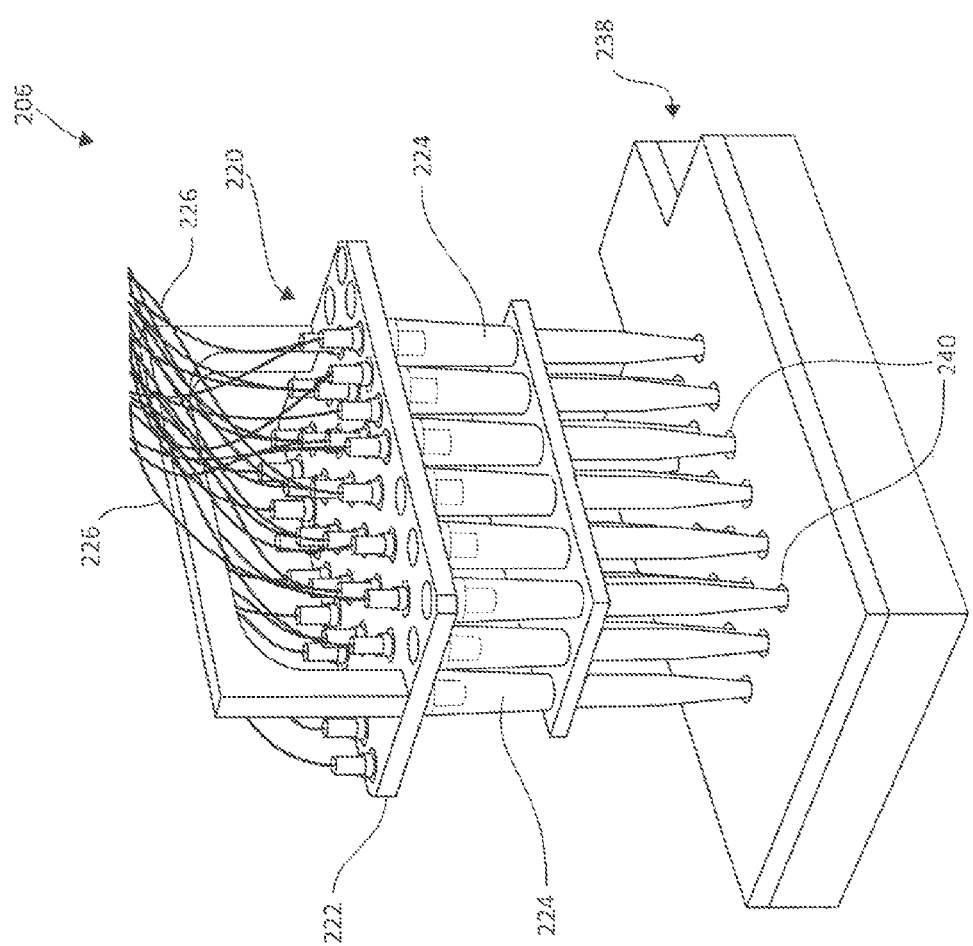

FIG. 4 illustrates the dispense arm 206 (or a portion thereof) in greater detail. The dispense arm 206 includes a dispense head 220 that is moveably suspended within the housing 202 (FIG. 2). The dispense head 220 includes a mounting plate 222 having a plurality of dispensers 224 and fluid lines 226 coupled thereto. In particular, an array of the dispensers 224 is connected to a bottom surface of the mounting plate 222, and the fluid lines 226 extend from an upper surface of the mounting plate 222 and are in fluid communication with the dispensers 224, as well as the fluid supply system (FIG. 2). As with the wells 218 (FIG. 3), the dispensers 224 may be arranged in a 3×5 array (although 3×6 arrays of dispensers 224 and openings (or wells or reactors) 240 in holder 238 are shown in FIG. 4). Furthermore, the dispensers 224 may be sized and spaced apart in a manner such that when the dispense head 220 is properly suspended above one of the well holder 204, each of the dispensers 224 is positioned directly over a respective one of the wells 218.

The dispense arm 206 (and/or dispense head 220) is used to dispense varied formulations, such as sol-gel formulations, into the wells 218 which are held by the well holders 204. The dispense arm 206 can have any configuration of dispensers 224. In another embodiment, the dispense arm 206 includes one row of dispensers 224 to fill one row of wells 218 at a time.

Figure 5:
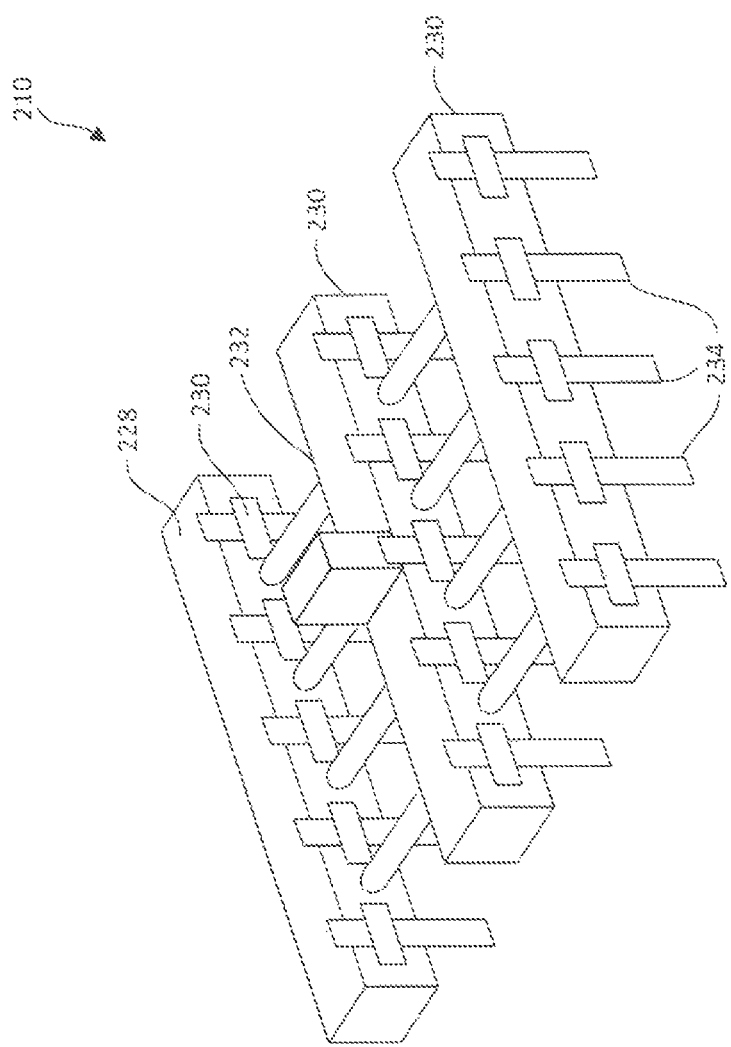

FIG. 5 illustrates one of the substrate holders (or clamp assemblies) 210 in greater detail. The substrate holder 210 includes a frame 228 having a plurality of substrate clamps 230 and a gripping protrusion 232 extending from an upper surface thereof. As shown, each of the substrate clamps 230 is securing a test substrate 234 to the substrate holder 210 such that the test substrates 234 are extending downwards from the substrate holder 210. As with the wells 218 (FIG. 3) and the dispensers 224 (FIG. 4), the substrate clamps 230 and/or the test substrates 234 are arranged in a 3×5 array. Furthermore, the test substrates 234 are sized and spaced apart in a manner such that when the substrate holder 210 is properly lowered towards one of the well holders 204, each of the test substrates 234 is inserted into a respective one of the wells 218.

The test substrates 234 may be formed of many types of materials, but in some embodiments may be glass or silicon. In an embodiment in which the test substrates 234 are glass, the glass may be, for example, float glass or a treated glass. The size of the test substrates 234 may be any size compatible for use in the combinatorial dip coating tool. In one particular embodiment, the test substrates 234 are coupons having dimensions of approximately 1 cm×10 cm. The size of the test substrates 234 may be decided based on the size limitations imposed by various characterization techniques for the subsequent films. Examples of test substrates 234 that may be used in embodiments of the current invention include, but are not limited to, soda-lime glass, borosilicate glass, single or multi-crystal silicon wafers, or photovoltaic cells with multiple device layers. The test substrates 234 may be optically flat, textured, or patterned.

Referring again to FIG. 2, the dip-coating arm 208 includes a gripper 236 that is moveably suspended within the housing 202 in a manner similar to the dispense head 220. The dip-coating arm 208 is configured to pick up one of the substrate holders 210 by grabbing the respective gripping protrusion 232 (FIG. 5). The dip-coating arm 208 may then suspend the substrate holder 210 over one of the well holders 204, and lower the substrate holder 210 towards the well holder 204 such that each of the test substrates 234 is inserted into a respective one of the wells 218 and is at least partially immersed in the formulation held by the well 218. The dip-coating arm 208 may then raise the substrate holder 210 away from the well holder 204 to draw the test substrates 234 from the wells 218 in a controlled manner.

The speed of the withdrawal is controlled to provide a particular thickness of the coating applied to the substrates. The draw speed can be determined based on the desired thickness of the coating. The dip coating can also be correlated to other types of coating processes such as spin coating, curtain coating, or spray coating.

In an alternate embodiment, the substrate holders 210 and/or the dip-coating arm 208 may be designed to clamp the same number of test substrates 234 as a single row or column of the well holder 204 so that the draw speed of the coatings may be varied between rows or columns. In such an embodiment, the dip-coating apparatus 200 may include more than one dip-coating arm 208 to simultaneously dip the rows or columns in the formulations and draw them from the formulations at different speeds.

Figure 6:
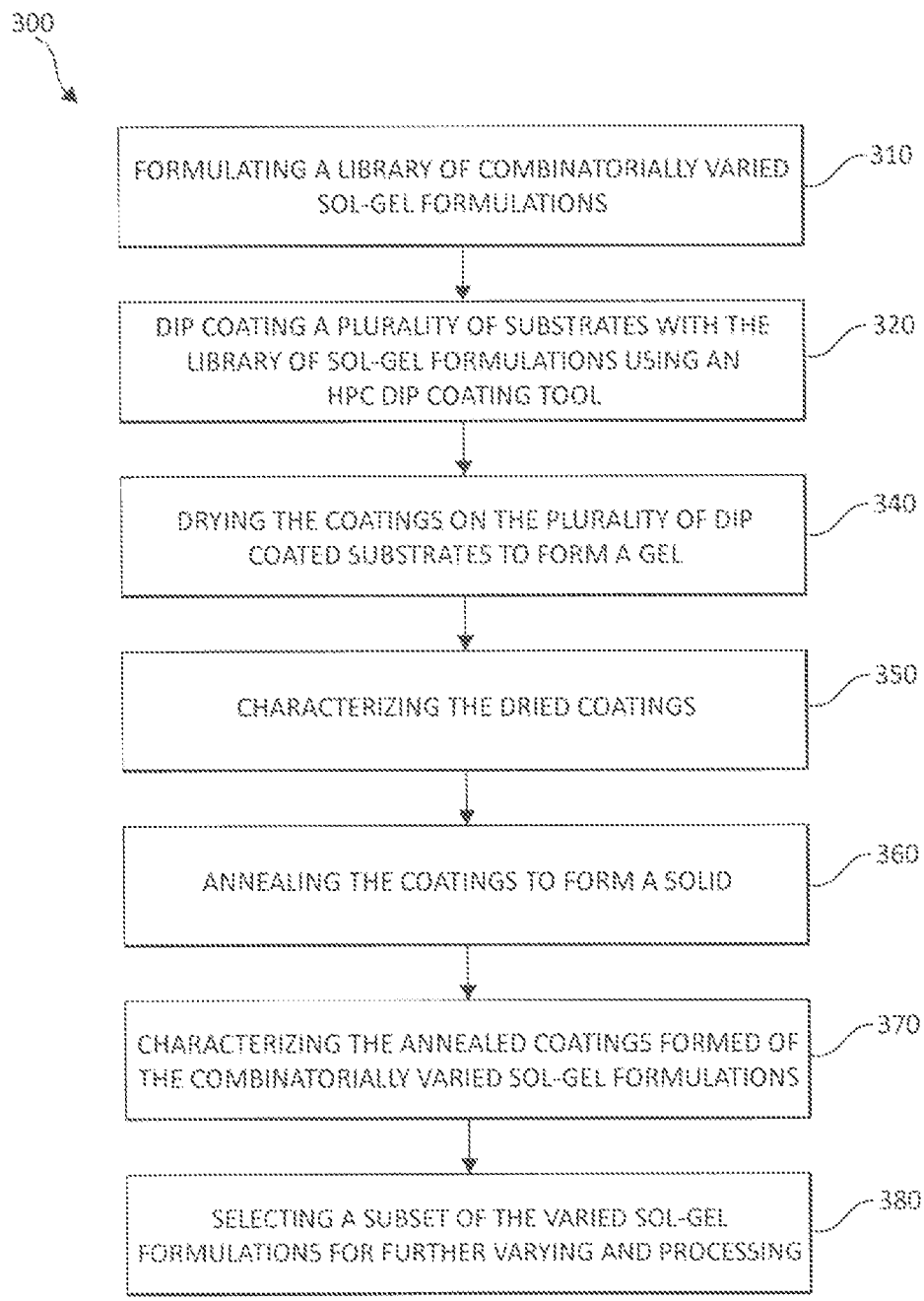

FIG. 6 is a flowchart of a primary screening method 300 according to one embodiment of the present invention. At step 310, a library of combinatorially varied sol-gel formulations is formulated.

The formulations themselves may be varied by varying the chemical composition of each of the formulations. For example, the composition of the formulation may be varied by varying one or more of the components based on the material itself or the ratios of the components. Examples of components commonly found in sol-gel formulations are monomers, solvents, surfactants, viscosity modifiers, cross-linking agents, accelerators, catalysts and porogens, although this list is not meant to be limiting. Alternatively, the individual substrates may be varied to determine the effects of coating on different types of materials. Examples of the substrates include glass, silicon, metallic coated materials, or plastics. The substrate could be optically flat, textured, or patterned. Also, different types of substrates may be used at different levels of screening. The library may be formulated using the dispensers 224 of the dispense arm 206. In another embodiment, the dispensers 224 may be used to retrieve formulations from the wells 218 of one well holder 204 and dispense them into the wells 218 of another one of the well holders 204, as opposed to receiving the formulations from the fluid supply system 214, thereby creating a library of combinatorially varied sol-gel formulations.

At step 320 in FIG. 6, the plurality of test substrates 234 are dip-coated with the library of sol-gel formulations that had been dispensed into the wells 218 of the well holder 204. The dip coating conditions may also be combinatorially varied. These conditions may include the draw speed, the environment within the housing 202, or the temperature within the housing 201.

FIG. 2C illustrates the plurality of substrates 215 after being coated with the varied sol-gel formulations during the dip-coating process of step 320, test substrates (now coated substrates) 234 are coated with varied coatings. At step 340, the coatings on the coated substrates 234 are dried to form a gel. The substrates 234 may remain clamped to the substrate holder 210 during the drying of the coatings. A gel is a coating that has both liquid and solid characteristics and may exhibit an organized material structure. During the drying, the solvent of the sol-gel formulation is evaporated and further bonds between the components, or precursor molecules, may be formed. The drying may be performed by exposing the coatings on the substrates 234 to the atmosphere at room temperature within the housing 202 of the dip-coating combinatorial tool 200. The coatings (and/or the substrates 234) may alternatively be removed from the housing 202 and exposed to a heated environment. The drying of the coatings may not require elevated temperatures, but may vary depending on the composition of the sol-gel formulations used to form the coatings. In one embodiment, the drying temperature may be in the range of approximately 25° C. to approximately 200° C. Drying temperature is dependent on the boiling point of the solvent used during sol formation. Additionally, the environment or heating conditions may be varied combinatorially to determine the effects of different atmospheres, pressures, or heating temperatures on the coatings.

The dried coatings formed of the combinatorially varied sol-gel formulations are characterized at step 350 in FIG. 6. The coatings may be characterized by visual methods, optical methods, ellipsometry, AFM, SEM, the optical transmission and reflectance of the coating, the film composition may be measured by XRD (X-Ray Diffraction) or XRF (X-Ray Fluorescence), and the detection of organic molecules in the film by FTIR (Fourier Transform Infrared) spectroscopy. The characterization may be automated for more efficient and high throughput processing. The substrates 234 may remain clamped to the substrate holder 210 during characterization and the dip-coating arm 208 may be automated to process each of the substrates 234 through the characterization tools. The characterization tools (not shown) may have adjustable stages such that they are easily adapted to any size substrate.

Still referring to FIG. 6, at step 360, the coatings are annealed to form a solid. The annealing of the coatings on the substrates 234 may be performed while the substrates 234 are clamped to the substrate holder 210. The annealing temperature may be selected based on the chemical composition of the sol-gel formulations, depending on what temperatures may be required to form cross-linking between the components throughout the coating. The substrates 234 may also remain clamped to the substrate holder 210 during the annealing of the coatings. The annealing temperature may also be varied combinatorially to determine the effects of different temperatures on the coatings. In one embodiment, the annealing temperature may be in the range of 500° C. and 1000° C. In should be understood that the annealing in step 360 is optional. In an embodiment, the coating may be a single coating. In alternate embodiments, the coating may be formed of multiple coatings on the same substrate. In such an embodiment, the dip-coating, gel-formation, and annealing may be repeated to form a multi-layered coating with any number of layers.

At step 370, the performance of each of the annealed coatings formed from the combinatorially varied sol-gel formulations is characterized. The characterization of the coatings may occur while the substrates 234 remain clamped to the substrate holder 210. Thus, it is possible that the dip-coating in step 320, the drying in step 340, the characterizing of the dried coatings in step 350, the annealing of the coatings in step 360, and the characterizing of the annealed coatings in step 370 may all be performed while the substrates 234 remain clamped to the substrate holder 210. Performing all of these processes while the substrates 234 remain clamped to the substrate holder 210 may allow for high processing throughput. The coatings may be characterized by many methods based on visual methods, the measurement of thickness and refractive index, the contact angle of the coating, the surface topography of the coating measured by AFM and SEM, the optical transmission and reflectance of the coating, the film composition may be measured by XRD (X-Ray Diffraction) or XRF (X-Ray Fluorescence), and the detection of organic molecules in the film by FTIR (Fourier Transform Infrared) spectroscopy. The characterization of the annealed coatings may be compared to the dried coatings to determine the effects of the components on the coatings. Different types of components will have different effects on the properties of the coatings after drying vs. after annealing.

The substrates 234 may still remain clamped to the substrate support 210 during the characterization of the annealed coatings. Doing so may improve the efficiency of the characterization as the characterization may be automated. Improvements in efficiency are valuable to high throughput combinatorial processing. The data obtained during characterization, and particularly during automated characterization, may be fed to a computer program capable of rapidly screening the data.

After characterization of the coatings, a subset of the varied sol-gel formulations that had been used to form the coatings are selected for further varying at step 370. The selection criteria for the screening may include sol stability, thickness and refractive index, and film uniformity. The further varying may occur by a feedback loop to another primary screening of the sol-gel formulations or coating conditions to further narrow down the candidates.

The further varying may also occur by proceeding to the secondary screening of the selected sol-gel formulations. The combinatorial methodology then funnels down to the secondary screening 104 of FIG. 1. The secondary screening 104 may include variation in process parameters such as the annealing conditions and possibly scaling up to another type of coating process. Other potential coating processes may include spin coating, spray coating, or curtain coating. The scale up to a different coating process may provide data to confirm that the process in the secondary screening 104 does in fact correlate to the dip coating process used in the primary screening 102. One goal of the secondary screening is to identify the coatings formed of sol-gel formulations that best perform in conditions to which the coatings will be subjected in a real-world application. The coatings identified to have qualities that fall within the range of pre-determined characteristics may then be selected and further screened.

The tertiary screening 106 of FIG. 1 involves the final screening of the coatings formed of the sol-gel formulations. In one embodiment, the subset of coatings screened at this screening level may be less than ten, in one particular embodiment the number of cleaning solutions may be one or two, but could be any number. The subset of coatings selected for tertiary screening 106 may be transferred to a pilot scale or industrial process for coating thin films. Devices incorporating the coatings may be completed to determine the effect of the coatings on the performance of the end product. The devices may be for many different fields, for example semiconductor devices, solar cell devices, or energy cell devices. The coating identified as providing the best performance for the devices may then be selected for integration into a device manufactured on a commercial scale.

Anti-Reflective Coatings

Coatings that give a low reflectivity over a broad wavelength range of light (e.g., anti-reflective coatings) are desirable in many applications. These coatings have an optimized refractive index in between air (n=1) and a substrate such as glass (n≈1.5). Low refractive index (low RI) coatings are thus of great interest. These low RI films may have many applications including solar and energy applications. The dip-coating/screening process described above may be applied to the screening and development of coatings having a lower refractive index (RI) than glass. The screening process depicted in FIG. 6 may be applied to the development of low RI films.

In particular, at step 310, a library of combinatorially varied sol-gel formulations to form low RI films is formulated. The number of combinatorially varied sol formulations screened during the primary screening may be on the order of 1000's of variations. Low RI films may be formulated of multiple components. The components of the sol-gel formulation used to form low RI coatings may include a precursor molecule, a solvent, additives and an accelerator. The precursor molecule is the component that will form the primary structure of the gel and of the resulting solid coating. Additives may be included for many purposes, for example, to tailor the refractive index of the coating, to modify the viscosity of the sol formulation, or to improve bonding of the coating with the substrate. An accelerator may be added to accelerate the cross-linking of the precursor molecules in the sol formulation. The solvent is added to solvate the components and to form the liquid solution that can be dip coated onto substrates during the combinatorial processing. The sol-gel formulations for the low RI films may be varied by varying any of the components concentrations, relative amounts, or the type of compound used.

In one embodiment, at step 310, the varied sol formulation for a low RI film involves use of tetraalkylorthosilicate, where the alkyl may be for example a methyl, an ethyl, or a propyl as the precursor molecule. The solvent is a mixture of alcohol and water, and either an acid or base as the accelerator. In this embodiment, the varied component of the formulation is a surfactant that acts as a porogen. The surfactant may be varied by type of surfactant or by the concentration of the surfactant. In one embodiment, the surfactants may be cationic. The combination of these components forms a sol, which is a dispersion of silica nano-particles stabilized in the solvent system. In one particular embodiment, the sol may be a solution of tetraethylorthosilicate (TEOS) as the precursor, a mixture of ethanol and water as the solvent, and hydrochloric acid (HCl) as the accelerator, and cetyltrimethylammonium bromide (CTAB) as the surfactant. The surfactant may be varied by adding mass fractions of CTAB ranging from approximately 1.5% to approximately 5%.

These varied low-RI sol formulations may be dip coated (in a manner similar to that described above) at step 320 onto substrates (e.g., substrates 234) processed by the combinatorial dip coating tool 200 illustrated in FIGS. 2-5. For the exemplary formulation of TEOS, ethanol, water, HCl, and CTAB, approximately 1 cm×10 cm test substrates are dipped into the sol solution for 30 seconds and are then drawn out in a controlled manner at a vertical draw speed of 7.6 cm/min at room temperature. In this example, the substrates may be borosilicate glass. The low-RI coatings are then dried on the substrates to form a gel. For example, the TEOS and CTAB formulation may be dried at 140° C. for two hours. The coatings are then characterized at step 350. The properties that are characterized include the total reflection, total transmission, thickness and the refractive index to compare to these properties after the annealing at step 360.

The coatings are then annealed at step 360 at a temperature high enough to form a solid coating. In the TEOS and CTAB formulation example, the annealing temperature may be 500° C. for 30 minutes.

The annealed low-RI film is then characterized at step 370 to determine the effect of the components on the refractive index of the low-RI film. The total reflection, the total transmission, and the thickness are measured and the refractive index is calculated. This information can be compared to the pre-annealing characterization to determine whether the variation in the sol formulation had an effect on any of the relevant properties. The porosity may also be quantified by measuring the roughness to establish a relationship between the surfactant (porogen), the porosity, and the refractive index of the low-RI coating. The roughness may be measured by AFM and SEM images. After performing the data analysis the coatings that meet the predetermined requirements for refractive index and porosity may be selected at block 380 for further variation and processing. Alternatively, porosity can also be measured by spectroscopic ellipsometry.

In an alternate embodiment, multiple layers of coatings may be deposited during the dip-coating, drying, and annealing cycle. This is possible when the coatings within the multi-layer film may all be deposited by a sol-gel method. The use of a combinatorial dip-coating tool to form the multiple coatings allows for high throughput processing and screening of the coatings. As such, combinatorial processing and tools provide a method of quickly testing and screening multiple layer coatings. Coatings with multiple layers may be used for multi-layer anti-reflective coatings. Multiple layers may be used to maximize anti-reflective properties and a combination of properties such as anti-reflective properties and passivation properties. For example, the multi-layer may be a gradient of low-RI coatings where the refractive index of the first coating deposited on the substrate is a material having a refractive index close to that of the substrate and ending with a top layer that is a material having a refractive index close to that of air. Any number of coatings may be used to create this gradient. The coating that is varied may be one or more of the coatings in the multi-layer.

In one particular embodiment the multi-layer may be formed of three coatings over a silicon substrate. The coating formed directly on the silicon substrate may be titanium dioxide (RI=1.9), the coating formed over titanium dioxide may be a mixture of titanium dioxide and silicon dioxide in a proportion that creates a refractive index of approximately 1.7, and the third and uppermost coating is formed of silicon dioxide (RI=1.45). Silicon dioxide provides good passivation for a silicon substrate but does not provide a good refractive index as an anti-reflective coating for the silicon substrate. Titanium dioxide has a good refractive index as an anti-reflective coating for silicon, but does not provide good passivation for silicon. In this embodiment the best qualities of both silicon dioxide and titanium dioxide may be employed by creating a multi-layered gradient starting with silicon dioxide formed over the silicon substrate and ending with a layer of titanium dioxide. The gradient in between these two layers may be formed of any number of layers. The combinatorial screening process described by the flowchart of FIG. 6 may be applied to this multi-layer embodiment. Coatings of both silicon dioxide and titanium dioxide, as well as any mixture of $SiO_2$ and $TiO_2$ can be deposited using the sol-gel dip coating process described in relation to the dip coating apparatus of FIGS. 2-5. The number of coatings or the composition of the coatings may be varied. The multiple coatings may be separated by distinct boundaries at the interface regions in an embodiment where the individual sol-gel coatings are completely solidified before the formation of the next sol-gel coating. In an alternate embodiment the coatings may remain in the gel phase (after only a drying step and no anneal) when the subsequent coating is applied. Two or more coatings in the gel phase may be deposited before annealing resulting in intermixing between the coatings at the interface regions.

At step 380 in FIG. 6, a subset of the low-RI coatings may be selected for further varying and processing. In the embodiment described above, the combinatorial screening was a primary screening to identify a subset of sol formulations by varying the chemistry of the sol formulations. The primary screening may be repeated any number of times to vary different chemical components, different mixtures of chemical components, or different concentrations of the formulations. The subset of sol formulations having the chemistries that form low-RI films with properties within a predefined range are then selected for a secondary screening process. The number of sol formulations selected for the subset may be on the order of 100's of sol formulations.

The secondary screening process follows the same process as described in the flowchart of FIG. 6 except that the further varying and processing identifies the optimal process conditions for the formation of low-RI coatings having properties within a predetermined range. During the secondary screening process, the library of combinatorially varied sol-gel formulations at step 310 of the flowchart in FIG. 6 is formed of the subset of sol compositions selected for further varying and processing during the primary screening process. The combinatorial variation in the secondary screening process may occur during the dip-coating of step 320. The draw speed may be varied or alternatively the temperature of the sol formulations may be varied. In another embodiment, the combinatorial variation may occur during the drying of step 340 by varying the drying temperature or drying time used to form the gel. In yet another embodiment, the combinatorial variation may occur during the annealing of step 360 by varying the annealing temperature or the annealing time to form the solid film. After any one or more of these variations during the secondary screening, a subset of the sol-gel formulations that have been combinatorially processed by varying conditions may be selected for further varying and processing. In an embodiment the secondary screening may be repeated any number of times to vary different conditions or to vary conditions on an even smaller subset of sol formulations.

In the tertiary screening of the anti-reflective coatings formed by the sol-gel process, the process is scaled up to a production process. For example, the production process could be spin coating, curtain coating, or spray coating of the process onto a substrate. The tertiary screening would test the subset of formulations under process conditions to determine the optimal formulation for the formation of an anti-reflective coating having predetermined properties. The subset may be on the order of tens of formulations, or even less than ten. The anti-reflective coatings formed during the tertiary screening may include an adhesion test (e.g. a tape test), a stress test, a humidity test, and a visual test of whether there is any color variation across the substrate. The identified formulation may then be further scaled up to manufacturing where the anti-reflective coating may be integrated into a product, such as a solar cell.

Particle Removal Applications

Figure 7:
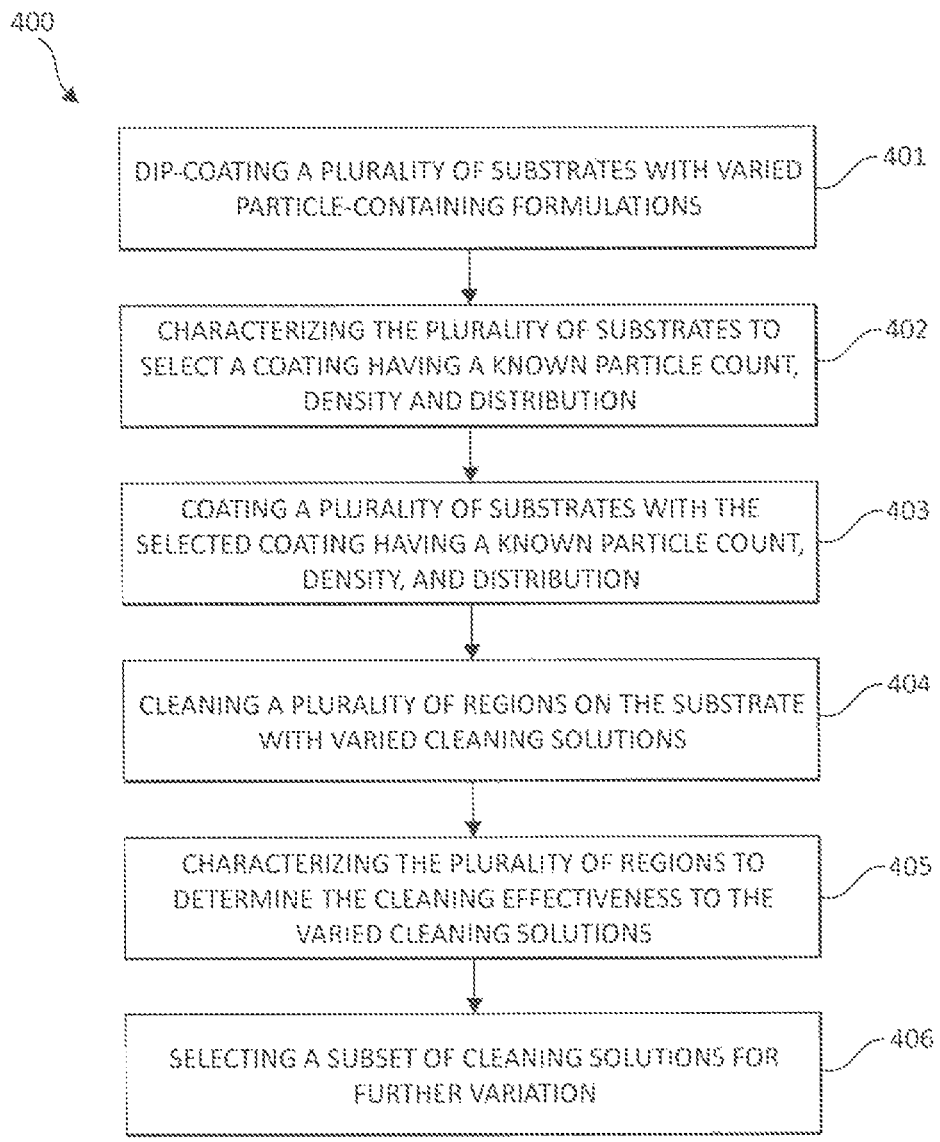

The sol-gel combinatorial methodology and tool described above may also be used to identify particle removal formulations having optimized particle removal capabilities. In this application, the sol-gel technique is used to form a uniform coating of particles having a known particle density and distribution on substrate coupons. A uniform coating of particles is identified using the combinatorial sol-gel tool and the identified coating will subsequently be used to test particle removal formulations using the combinatorial sol-gel tool. This methodology may be used to develop cleaning formulations for semiconductor or solar processing. Obtaining contaminated semiconductor or solar substrates from between process steps is difficult and the particle density and distribution may vary greatly from one substrate to the next. Therefore, a process where contaminated substrates may be simulated and controlled may have value for the development of particle removal formulations that may be used in production. FIG. 7 is a flowchart of a combinatorial method 400 of identifying particle removal formulations.

At step 401, a plurality of substrates (e.g., the substrates 234 in FIG. 5) is dip-coated with varied particle-containing formulations. The varied particle containing formulations may be a slurry formed of particulates, such as silica, ceria, organics, inorganics and metallics, suspended in a solution. The particle containing formulations may also contain stabilizers, solvents, etchants or viscosity modifiers. The particle containing formulations may be designed to provide the types of contaminants that would be found on a substrate during a particular stage of processing. Examples of contaminants that may be introduced during different stages of semiconductor processing may include different metals or abrasives, such as those that would be created during chemical mechanical polishing (CMP). These contaminants may also be precipitates from various cleaning formulations applied during semiconductor or solar substrate processing. The precipitates may be, for example, organic, inorganic or metallic materials. The particle-containing formulations may be varied by varying the chemical composition of the formulations or by varying the draw speed of the substrates during the dip-coating process. The chemical composition may be varied by varying the viscosity, the particle concentration, or the temperature of the particle-containing formulations.

At step 402, the coatings are characterized to select a coating having a known particle count. The particle count will be a combination of the particle distribution and density over the surface of the substrate. The distribution and density of the particles may be measured by testing multiple positions on the substrate by taking pictures of those positions. The testing may be automated and the particle distribution, density, and count may be determined by analysis of those pictures by software developed for such a purpose. The predetermined particle distribution, density, and count may be based on information obtained from actual substrates analyzed during a production process. The particle contamination information obtained from the actual processing may be mirrored or modified in a known manner to test a particle cleaning formulation. Particle coatings are selected after characterizing the plurality of substrates based on the selected predetermined contamination information.

The coatings selected at step 402 are then dip-coated onto a plurality of substrates to form coatings having a known particle count. The coated substrates may be created using the same combinatorial dip-coating tool and method described above. Alternatively, a single substrate may be coated with a single selected coating and then tested using a combinatorial processing tool similar to that described above.

The plurality of substrates having coatings with known particle counts are then dip-coated into a plurality of varied cleaning solutions at step 404. The coated substrates may remain clamped to the substrate holder 210 during the processes of steps 403 and 404.

Figure 8:
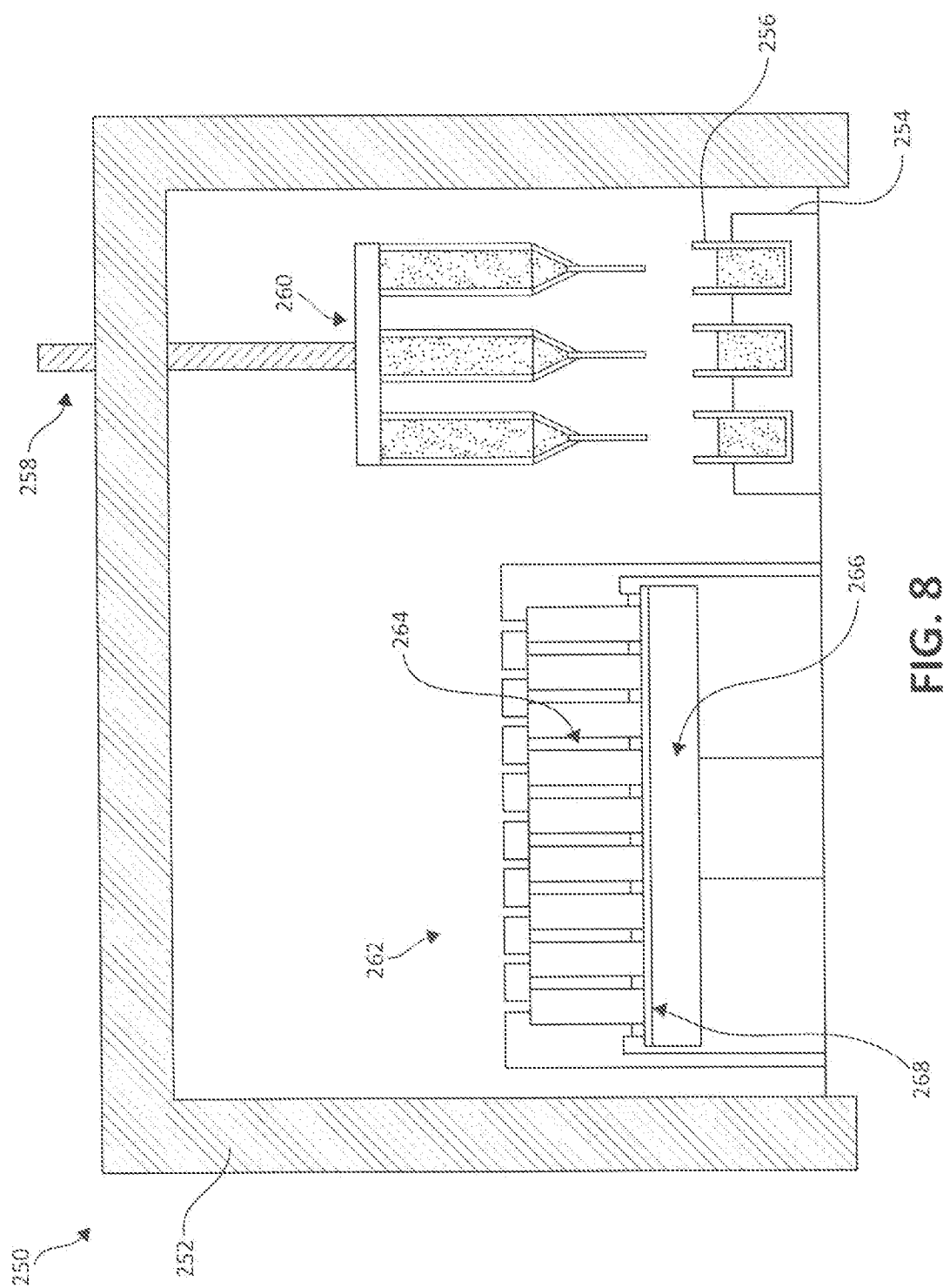

Alternatively, if a single substrate is coated with the coating having known particle count, density, and distribution, a plurality of cleaning solutions may be applied to site-isolated regions of the substrate using the combinatorial wet processing tool 250 illustrated in FIG. 8.

The combinatorial wet processing tool 250 includes a housing (and/or processing chamber) 252, a well holder 254 holding wells 256, and a dispense arm 258 having a dispense head 260, similar to the dip-coating combinatorial apparatus 200 described above. The wet processing tool 250 also includes a reactor assembly 262 having an array or reactors (or fluid containers) 264 positioned over a substrate support 266. A substrate 268 is placed on the substrate support 266 and positioned relative to the reactors 264 such that bottom edges of the reactors contact the substrate 268 and form seals around the respective portions of the substrate 268. In a manner similar to that described above, the dispense arm 258 may retrieve cleaning solutions from the wells 254 and dispense them into the reactors 264. Because of the seals formed between the reactors 264 and the substrate 268, the cleaning solutions remain within the reactors 264 and are isolated from the other cleaning solutions. The cleaning solutions may be varied by varying the chemical composition or temperature. The time of application of the cleaning solutions may also be varied. It should be understood that although the wet processing tool 250 in FIG. 8 is shown as being separate, it may be integrated into the dip-coating apparatus shown in FIG. 2.

Referring again to FIG. 7, the effectiveness of the cleaning solutions may then be characterized at step 405. The characterization may be performed by measuring the particle count remaining on the substrate or substrates. The particle count may be measured using a similar method as outlined above where a digital photograph of the substrate may be taken and then analyzed using automated software. The effect of the cleaning solution on the coating may also be characterized using AFM measurements or SEM measurements. The thickness of the coating may be measured before applying the cleaning solution to the substrate to compare to the post-cleaning thickness to determine whether the cleaning solution etches the coating.

At step 406, a subset of the cleaning solutions may be selected for further variation during another iteration of primary screening or secondary screening. The secondary screening may focus on another aspect of the cleaning formulation composition or the conditions under which the cleaning formulation is applied to the substrate. Another iteration of primary screening or secondary screening may repeat steps 403 though 406 in FIG. 7. Once a subset of cleaning formulations, on the order of tens of formulations, has been identified, the formulations may be tested at a tertiary level. The tertiary screening may test the formulations using a production scale process. For example, actual contaminated substrates from a semiconductor or solar production process may be tested to identify a cleaning formulation that may be used in actual production.

In an alternate embodiment, the combinatorial dip-coating tool 200 of FIG. 2 may be used to test particle-resistant coatings. This may be done by first dip-coating a plurality of substrates with varied particle-resistant coatings and then dip-coating the substrates with the varied particle-resistant coatings into particle-containing formulations. The particle-containing formulations may be selected using the same process as described above in relation to the process described in steps 401 and 402 in FIG. 4. Particle-containing formulations may be selected based on the type of particle-resistant coating being developed. The particle-resistant coatings may be developed to be resistant to inorganic or organic contamination for a wide range of applications. These applications may include, for example, particle-resistant coatings for touch screens. Other examples of applications for particle-resistant coatings include solar panels and glass for different applications such as windows and windshields.

In another alternate embodiment, the combinatorial dip-coating tool 200 may be used for the dipping of substrates into texturing formulations to combinatorially develop the texturing formulations. In such an embodiment, the test substrates may be developed for use in solar applications. For example, the substrates may be silicon (monocrystalline, polycrystalline, or amorphous) to develop a silicon texturing formulation. Alternatively, the substrates may be glass that has been coated with a transparent conductive oxide (TCO) to develop a TCO texturing formulation. In the TCO embodiment, the substrates may be coated with the TCO before or after being cut into coupons for combinatorial testing. The use of the dip-coating tool for the combinatorial evaluation of texturing formulations may provide the advantages of maintaining the texturing formulations at a constant temperature and of visual observation of the texturing process. The well holder in which the texturing formulations are held may include conduits for flowing liquid therethrough to maintain the formulations at a particular temperature. Additionally, because the well holder is open from above, an observer or a camera may visually assess the progress of the texturing process. Visual observation may be valuable because as most texturing processes proceed the color of the substrate will change, providing an observer with valuable information on the progress of the texturing reactions. This information may be recorded digitally with a video recorder for processing of the information by an observer or by a computer to gain an understanding of the different texturing formulations.

These texturing formulations may be varied by varying the chemical compositions thereof. The textured substrates may then be characterized and a subset may be selected for further varying by either primary or secondary combinatorial screening. Experiments may be designed based on the predetermined properties required for the textured substrate. Once the texturing formulations have been narrowed down to the order of tens of formulations, the tertiary screening of the texturing formulation may occur on a production scale process.

In one embodiment of the present invention, a method for testing coating formulations is provided. A plurality of coating formulations are provided. A plurality of test substrates are simultaneously dip coated in the plurality of coating formulations to generate a plurality of coated substrates. A variation between at least two of the plurality of coated substrates is generated. The plurality of coated substrates are characterized to obtain characterizing results. A subset of the plurality of coating formulations is selected based on the characterizing of the plurality of coated substrates.

In another embodiment, a method for testing sol-gel coating formulations is provided. A first screening is performed to identify a subset of sol-gel coating formulations having predetermined characteristics. In the first screening, a plurality of sol-gel coating formulations are provided within a housing of a coating formulation apparatus. A plurality of test substrates are simultaneously dip coated in the plurality of sol-gel coating formulations to generate a plurality of coated substrates. A variation between at least two of the plurality of coated substrates is generated. A subset of the plurality of sol-gel coating formulations is selected based on characterization results. A second screening is performed by coating a second plurality of test substrates with the selected subset of the plurality of sol-gel coating formulations, wherein the coating is performed using spin coating.

In a further embodiment, an apparatus for testing coating formulations is provided. The apparatus includes a housing enclosing a testing chamber, a plurality of vessels coupled to the housing and positioned within the testing chamber, each of the plurality of vessels being configured to hold one of a plurality of coating formulations, a dip coating assembly coupled to the housing and configured to hold a plurality of test substrates, simultaneously dip each of the test substrates into one of the plurality of coating formulations, and draw the test substrates from the plurality of coating formulations to form a plurality of coated substrates. The apparatus also includes a variation generating system coupled to the housing and configured to generate a variation between at least two of the coated substrates.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method for selecting a subset of particle-containing formulations from a plurality of particle-containing formulations comprising:
    providing a plurality of particle-containing formulations, wherein a variation is generated between at least two of the plurality of particle-containing formulations;
    providing a plurality of dip-coating conditions for dip coating a plurality of test substrates, wherein a variation is generated between at least two of the plurality of dip-coating conditions;
    simultaneously dip coating the plurality of test substrates under the plurality of dip-coating conditions in the plurality of particle-containing formulations to generate a plurality of particle-coated substrates, wherein the simultaneous dip coating of the plurality of test substrates in the plurality of particle-containing formulations comprises:
        simultaneously immersing at least a portion of each of the plurality of test substrates in one of the plurality of particle-containing formulations with a dip coating assembly, and wherein the dip coating assembly is configured to draw at least two of the plurality of test substrates from the respective particle-containing formulations at different speeds, and
        drawing at least two of the plurality of test substrates from the respective particle-containing formulations at different speeds with the dip coating assembly;
    characterizing the plurality of particle-coated substrates to obtain characterizing results; and selecting a subset of the plurality of particle-containing formulations based on the characterizing of the plurality of particle-coated substrates.

2. The method of claim 1, wherein each of the particle-containing formulations comprises a plurality of particulates and a liquid.

3. The method of claim 2, wherein the plurality of particulates comprises silica, ceria, organic material, inorganic material, metallic material, or a combination thereof.

4. The method of claim 3, wherein each of the plurality of test substrates is detachably secured to the dip coating assembly.

5. The method of claim 4, further comprising coating a second plurality of test substrates with the selected subset of the plurality of particle-containing formulations, wherein the coating is performed using spin coating, spray coating, or curtain coating.

6. The method of claim 5, wherein each of the particle-containing formulations further comprises a stabilizer, a solvent, an etchant, a viscosity modifier, or a combination thereof.

7. The method of claim 6, wherein a second plurality of particle-containing formulations is held a second set of the plurality of sets of wells.

8. The method of claim 3, wherein the at least two of the plurality of particle-containing formulations vary by chemical composition.

9. The method of claim 4, wherein the dip coating of the plurality of test substrates in the plurality of particle-containing formulations is performed in an environmentally controlled housing, and wherein a plurality of sets of wells are positioned within the housing, a first set of the plurality of sets of wells holding the plurality of particle-containing formulations.

10. The method of claim 3, wherein the at least two of the dip-coating conditions vary by a temperature of the plurality of particle-containing formulations, a temperature of the plurality of particle-coated substrates, or a combination thereof.

11. A method for depositing contaminants on substrates comprising:
providing a plurality of particle-containing formulations, wherein at least two of the plurality of particle-containing formulations vary by chemical composition;
providing a plurality of dip-coating conditions for dip coating a plurality of test substrates, wherein at least two of the plurality of dip-coating conditions vary by chemical composition; and
simultaneously dip coating the plurality of test substrates under the plurality of dip-coating conditions in the plurality of particle-containing formulations to generate a plurality of contaminated substrates, wherein the simultaneous dip coating of the plurality of test substrates in the plurality of particle-containing formulations comprises:
simultaneously immersing at least a portion of each of the plurality of test substrates in one of the plurality of particle-containing formulations with a dip coating assembly, and wherein the dip coating assembly is configured to draw at least two of the plurality of test substrates from the respective particle-containing formulations at different speeds, and
drawing at least two of the plurality of test substrates from the respective particle-containing formulations at different speeds with the dip coating assembly.

12. The method of claim 11, wherein each of the particle-containing formulations is a slurry comprising plurality of particulates and a liquid.

13. The method of claim 12, wherein the plurality of particulates comprises silica, ceria, organic material, inorganic material, metallic material, or a combination thereof.

14. The method of claim 11, further comprising:
characterizing the plurality of contaminated substrates to obtain characterizing results;
selecting a subset of the plurality of particle-containing formulations based on the characterizing of the plurality of contaminated substrates; and
coating a second plurality of test substrates with the selected subset of the plurality of particle-containing formulations, wherein the coating is performed using spin coating, spray coating, or curtain coating.

15. The method of claim 11, wherein the simultaneous dip coating of the plurality of test substrates is performed in an environmentally controlled housing, and wherein a plurality of sets of wells are positioned within the housing, a first set of the plurality of sets of wells holding the plurality of particle-containing formulations and a second set of the plurality of sets of wells holding a second plurality of particle-containing formulations.

* * * * *